US010388178B2

(12) United States Patent
Graesser et al.

(10) Patent No.: US 10,388,178 B2
(45) Date of Patent: Aug. 20, 2019

(54) AFFECT-SENSITIVE INTELLIGENT TUTORING SYSTEM

(76) Inventors: Arthur Carl Graesser, Memphis, TN (US); Sidney Keith D'Mello, Memphis, TN (US)

(*) Notice: Subject to any disclaimer, the term of this patent is extended or adjusted under 35 U.S.C. 154(b) by 1193 days.

(21) Appl. No.: 12/898,132

(22) Filed: Oct. 5, 2010

(65) Prior Publication Data
US 2012/0052476 A1    Mar. 1, 2012

Related U.S. Application Data

(60) Provisional application No. 61/377,629, filed on Aug. 27, 2010.

(51) Int. Cl.
*G09B 7/04* (2006.01)
(52) U.S. Cl.
CPC ..................... *G09B 7/04* (2013.01)
(58) Field of Classification Search
CPC ........................................... G09B 7/04
USPC .......................................... 434/362
See application file for complete search history.

(56) References Cited

U.S. PATENT DOCUMENTS

| 2004/0176991 A1* | 9/2004 | McKennan | G06F 3/011 702/182 |
| 2004/0222892 A1* | 11/2004 | Balaban et al. | 340/573.7 |
| 2005/0271279 A1* | 12/2005 | Fujimura et al. | 382/203 |

OTHER PUBLICATIONS

"AutoTutor: An Intelligent Tutoring System With Mixed-Initiative Dialogue." IEEE Transactions on Education, vol. 48, No. 4, Nov. 2005, Arthur C. Graesser et al.*

* cited by examiner

*Primary Examiner* — Robert P Bullington
(74) *Attorney, Agent, or Firm* — Wayne Edward Ramage; Baker Donelson

(57) ABSTRACT

An Intelligent Tutoring System (ITS) system is provided that is able to identify and respond adaptively to the learner's or student's affective states (i.e., emotional states such as confusion. frustration, boredom, and flow/engagement) during a typical learning experience, in addition to adapting to the learner's cognitive states. The system comprises a new signal processing model and algorithm, as well as several non-intrusive sensing devices, and identifies and assesses affective states through dialog assessment techniques, video capture and analysis of the student's face, determination of the body posture of the student, pressure on a pressure sensitive mouse, and pressure on a pressure sensitive keyboard. By synthesizing the output from these measures, the system responds with appropriate conversational and pedagogical dialog that helps the learner regulate negative emotions in order to promote learning and engagement.

14 Claims, 3 Drawing Sheets

AFFECT-SENSITIVE INTELLIGENT TUTORING SYSTEM

This application claims benefit of and priority to U.S. Provisional Application No. 61/377,629, filed Aug. 27, 2010, by Arthur C. Graesser, et al., and is entitled to that filing date for priority. The specification, figures and complete disclosure of U.S. Provisional Application No. 61/377,629 are incorporated herein by specific reference for all purposes.

This invention was made with the support of the United States government under National Science Foundation Contract No. ITR 0325428. The Government has certain rights in this invention.

FIELD OF INVENTION

This invention relates to an affect-sensitive Intelligent Tutoring System that responds to a student's cognitive and emotional states.

BACKGROUND OF THE INVENTION

The advantages of interactive dialogue or tutoring as a teaching and learning technique in certain circumstances are well-known. Interactive dialogue allows the tutor to detect and remediate failed communications, incorrect student knowledge, and apparent gaps in the student's knowledge. Additionally, tutoring demands the student's attention in order to interact with the tutor, whereas the student's attention is more likely to wander when reading by himself or herself.

Recently, automated computer tutors, also known as Intelligent Tutoring Systems (ITS), have been developed that assist students in learning about a variety of topics, including, but not limited to, science, mathematics, technology, and computer literacy (e.g., hardware, software, and programming). An example of such a tutor program is AutoTutor, which presents questions and problems from a curriculum script, attempts to comprehend learner contributions that are entered by keyboard or by speech, formulates dialog moves that are sensitive to the learner's contributions (such as prompts, elaborations, corrections, and hints), and delivers the dialog moves with a talking head. The talking head serves as a conversation partner with the learner. It delivers AutoTutor's dialog moves with synthesized speech, appropriate intonation, facial expressions, and gestures. At the top of the computer interaction screen, AutoTutor prints the questions and problems that are produced from a curriculum script. These questions and problems invite lengthy responses and deep reasoning (e.g., answers to why, how, what-if), as opposed to being fill-in-the blank questions or shallow questions. There is a multi-turn tutorial dialog between AutoTutor and the learner during the course of answering a question (or solving a problem). The learner types in his/her contributions during the exchange by keyboard. For some topics, there are graphical displays and animation, with components that AutoTutor points to.

AutoTutor can keep the dialogue on track because it is constantly comparing students' contributions to expected answers. Sophisticated pattern matching and natural language processing mechanisms drive the comparisons, with the focus always being on the student's verbal contributions. Up to the present, AutoTutor and other ITS have been unable to detect and respond to emotional and non-verbal cues from the student. Verbal and non-verbal channels show a remarkable degree of sophisticated coordination in human-human communication. While the linguistic channel mainly conveys the content of the message, non-verbal behaviors play a fundamental role in expressing the affective states, attitudes, and social dynamics of the communicators. Although ubiquitous to human-human interactions, the information expressed through non-verbal communicative channels is largely ignored in human-computer interactions. Simply put, there is a great divide between the highly expressive human and the computer.

SUMMARY OF INVENTION

In various embodiments, the present invention comprises an ITS that is able to identify and respond adaptively to the learner's affective states (i.e., emotional states such as boredom, confusion, and frustration) during a typical learning session in addition to adapting to the learner's cognitive states. In one embodiment, the system comprises a new signal processing model and algorithm, as well as several non-intrusive sensing devices. The system identifies and assesses affective states through dialog assessment techniques, video capture and analysis of the student's face, determination of the body posture of the student, pressure on a pressure sensitive mouse, and pressure on a pressure sensitive keyboard. By synthesizing the output from these measures, the present invention responds with appropriate conversational and pedagogical dialog that is sensitive to the learner's emotions. For example, if a student is frustrated, then the present invention responds with an empathetic and motivating statement along with a good hint or prompt that would guide the learner back toward the learner's zone of knowledge. In another example, the present invention may prolong a state of confusion to promote the student's own problem solving and reasoning skills during the state of cognitive disequilibrium, which in turn could lead to deeper learning and misconception remediation. The system can scaffold learners to new levels of understanding through ideal patterns of emotions: intellectual arousal, confusion combined with curiosity (when there is cognitive disequilibrium), and moments of delight, while minimizing frustration, anger, and boredom. It thus provides a unique learning environment that is unavailable in previous tutorial interactions.

In one embodiment, automated posture analysis is accomplished through cameras and associated computer vision techniques to monitor body position and movement of a user. In another embodiment, the determination of body posture is accomplished by means of a pressure measurement device (e.g., one or more thin-film pressure pads or mats), which can be mounted on a variety of surfaces. These pads or mats can measure relative pressure on different parts of the seat on which the student is sitting, for example.

In one exemplary embodiment, the system uses the Tekscan Body Pressure Measurement System (BPMS) to monitor student's patterns while they interact with the system. The BPMS gauges the distribution of pressure on surfaces (e.g., seat, back). In one exemplary embodiment, the system uses two sensor pads to ascertain student's posture patterns as they interact with the tutor. The first pad is placed on the seat. The second sensor pad is placed on the back support of the chair. The output from the sensor pads may be analyzed by dividing the sensing region into quadrants (or some other number of areas, such as nine) and assessing the average pressure exerted in each quadrant over time. This is preferred over a fine-grained analysis of each individual sensing point, as it may be more indicative of gross body movement, and more computationally efficient.

In another embodiment, the system may automatically detect a learner's interest level using body posture patterns using a neural network for real-time classification of nine static postures (e.g., leaning back, leaning right, right leg crossed, sitting upright, and the like). In this embodiment, the system recognizes interest (e.g., high interest, low interest, and taking a break) by analyzing posture sequences.

In yet another embodiment, facial assessment is accomplished using an upper facial sensor system. In one embodiment, recognition of facial expressions is a multi stage process. First, the system locates and tracks the pupils of the eye in real-time. Second, the system fits templates to the upper facial features (eyes and brows) in real-time. Third, the system labels facial action units. In one embodiment, up to six upper facial action units are labeled. A facial recognition system of this sort provides a 12-dimensional vector corresponding to action units around the eyes.

In another embodiment, dialog patterns are analyzed to help determine affective states. A pattern analysis module keeps track of the dialog with the student, and detects patterns of dialog that are indicative of affective states based upon the dialog within that session, and upon the student's interactive history. The system's log files provide a wealth of information regarding the interactive session with the student. At each student's turn, the tutor system writes its assessment of the student's response along with some internal information to a form of stable storage (e.g., hard disk). Assessment of the student's responses includes, but is not limited to, the following information: the correctness of an answer; the verbosity of the student response; reaction and response times; the length of an answer; and a host of other parameters about the conceptual quality of the student's turns. In one embodiment, the system also classifies, using the Speech Act Classification System, the student's response into five broad dialog categories: meta-communicative, metacognitive, questions, short responses, and substantive contributions. After assessing a student's response, the tutor provides short feedback on the contribution (positive, negative, neutral), and makes a substantive dialog move (e.g., hint, prompt, assertion) that advances the conversation. The sequence of these dialog events by the tutor and student are mined to determine learner emotions.

In a further embodiment, the system keeps track of seven different affect states that potentially occur during the process of learning: confusion, frustration, boredom, flow/engagement, delight, surprise, and neutral. Other embodiments may keep track of a subset of these states or additional states.

DETAILED DESCRIPTION OF EXEMPLARY EMBODIMENTS

Figure 1:
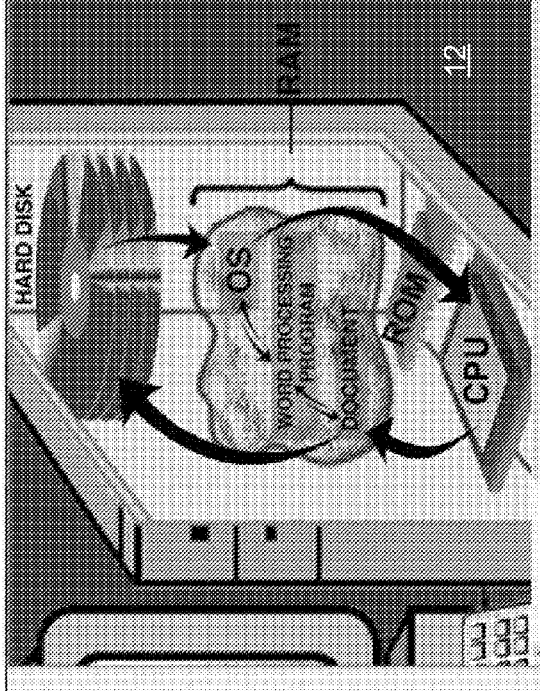
FIG. 1 shows a view of an ITS interface in accordance with an embodiment of the present invention.

A typical ITS has a number of separate modules. A Domain Knowledge module contains the subject matter information that the tutor is teaching. A Student Model module maintains information about particular users, such as how far they have progressed on a topic and what errors they have made. A Diagnosis module contains the rules or algorithms that identify the student's knowledge gaps and misconceptions, whereas a Pedagogical module decides how the domain knowledge is presented and what training approaches to use. A Communication module is the user interface (e.g., keyboard, mouse, sensing device, screen display/layout, natural language) that presents the material to the learner and accepts learner input.

In various embodiments, the present invention comprises several improvements over an existing ITS known as "AutoTutor" (while portions of the subsequent discussion herein specifically refer to the AutoTutor ITS, these references are not intended to be limiting, and various aspects of the present invention can be applied to any ITS). Various aspects and components of AutoTutor and/or the invention are described in "AutoTutor Holds Conversations with Learners that are Responsive to their Cognitive and Emotional States," by Arthur C. Graesser, et al.; "The Relationship Between Affective States and Dialog Patterns During Interactions with AutoTutor," by Sidney K. D'Mello, et al.; "Responding to Learner's Cognitive-Affective States with Supportive and Shakeup Dialogues," by Sidney D'Mello, et al.; "Automatic Detection of Learner's Affect from Gross Body Language," by Sidney D'Mello, et al.; "A Time for Emoting: When Affect-Sensitivity Is and Isn't Effective at Promoting Deep Learning," by Sidney D'Mello, et al.; and "Multimodal Affect Detection from Conversational Cues, Gross Body Language, and Facial Features," by Sidney D'Mello, et al.; all of which are incorporated herein by specific reference for all purposes.

AutoTutor is an as or automated computer tutor, which may be accessible on a personal computer or computing device, individually or through a network, such as the Internet. It simulates a human tutor and helps individuals learn about topics in various areas, including, but not limited to, science (e.g., physics) and technology (e.g., computer literacy) by holding a conversation in natural language. Students or learners type in their responses through a keyboard, or speak into a microphone (for embodiments with speech recognition), and AutoTutor communicates either through text or through an animated conversational agent with speech, facial expressions, and some rudimentary gestures. AutoTutor presents a series of challenging questions (such as "why?", "how?", and "what-if?") that require approximately a paragraph of information for an ideal answer. AutoTutor assists the learner in the evolution of a better answer from their initial answer. It tries to draw out more of the learner's knowledge (e.g., through hints and prompts), helps fill in missing information, repairs misconceptions, and answers student questions. AutoTutor provides feedback on what the student types in (positive, neutral, negative feedback), pumps the student for more information ("What else?"), prompts the student to fill in missing words, gives hints ("What about X?"), fills in missing information with assertions, identifies and corrects misconceptions and erroneous ideas, answers the student's questions, and summarizes topics. A full answer to a question is eventually constructed during this dialog, which normally takes between 30 and 200 turns between the student and tutor (just as with human tutors).

AutoTutor's knowledge about the topic being tutored is represented by a curriculum script on the material. In addition, AutoTutor uses Latent Semantic Analysis (LSA) to comprehend the student's responses. LSA is a statistical technique that measures the conceptual similarity of any two texts that can range from one word to a lengthy article. LSA computes a geometric cosine (ranging from 0 to 1) that represents the conceptual similarity between the two text sources. In AutoTutor, LSA is used to assess the quality of student responses and to monitor other informative parameters, such as Topic Coverage and Student Ability Level. Student response quality is measured by comparing each response against two classes of content stored in the curriculum script: one that contains potentially good answers to the topic being discussed (called expectations) and one that contains the anticipated bad answers (called misconceptions). The higher of the two geometric cosines (i.e., a measure of the conceptual match between student input and expectations versus misconceptions) is considered the best conceptual match, and therefore, determines how AutoTutor responds to the student contributions in a dialog turn. The application of LSA is sufficiently accurate in evaluating the quality of learner responses, which are often ungrammatically and not semantically well formed. AutoTutor uses other techniques in computational linguistics to evaluate semantic matches between learner responses and expectations or misconceptions (such as content word overlap inversely weighted by word frequency or matches to regular expressions).

AutoTutor engages in mixed-initiative dialogue to accommodate virtually any student question, assertion, comment, or extraneous speech act. Each turn of AutoTutor requires the generation of one or more dialogue moves that adaptively respond to what the student just expressed and that advance the conversation in a constructive fashion. The tutor's dialogue moves within a turn are connected by discourse markers. Some dialogue moves are very responsive to the student's preceding turn, such as the short feedback (positive, neutral, versus negative), answers to student questions, and corrections of student misconceptions. Other dialogue moves push the dialogue forward in an attempt to cover the expected answers to the main question.

AutoTutor delivers its dialogue moves with an animated conversational agent that has a text-to-speech engine, facial expressions, gestures, and pointing. An example of an interface with typing input is shown in FIG. 1. The main question is presented in the top window 2. This major question remains at the top of the page until it is finished being answered during a multi-turn dialogue. The students use the bottom-right window 4 to type in their contributions for each turn. The animated conversational agent resides in the upper-left area 6. The dialogue history between tutor and student is shown in the bottom left window 8.

A session with AutoTutor is comprised of a set of subtopics (difficult questions or problems) that cover specific areas of the main topic (e.g., hardware, Internet, and operating systems). Each subtopic is manifested by a series of turns in which AutoTutor maintains a conversation with the student in an attempt to construct an answer to the current subtopic. When an acceptable answer with the appropriate details is gleaned from the student's responses (usually after 30 to 200 turns), AutoTutor moves on to the next subtopic. At the end of each student turn, AutoTutor maintains a log file that captures the student's response, a variety of assessments of the response, and the tutor's next move. Temporal information such as the student's reaction time and response time are also maintained.

In another exemplary embodiment, AutoTutor is augmented with embedded interactive 3D simulations which provides an additional channel of communication. Each simulation is crafted to cover particular physics principles that should be included in an ideal answer (e.g., Newton's second law that states that the net force on a body equals mass times acceleration), or they are designed to help correct particular misconceptions about physics (such as the impetus fallacy). The student can manipulate parameters of the situation (e.g., mass and speed of vehicles), observe a simulation of what will happen, and explain what they see. Similar simulations may be used for other areas and topics.

After each simulation loads, AutoTutor challenges the student to formulate a hypothesis that predicts what will happen within the simulation. The student can manipulate any available parameters of the situation (e.g., mass and speed of objects) and then ask the system to simulate what will happen. They are prompted to compare their expected simulated outcome with the actual outcome after the simulation is completed. Students can run as many simulations as they wish until they feel they understand the relationship between parameters and outcomes of simulations. However, interacting with and viewing the simulations is not all there is. In order to manage the interactive simulation, AutoTutor gives hints and suggestions, once again scaffolding the learning process with dialogue. AutoTutor thus comprises tutorial dialogue scaffolding interactive simulation. Deep learning of the topic being tutored emerges from the combination of interactivity, perceptual simulation, feedback on the simulation, and explaining what happens.

In another exemplary embodiment, AutoTutor, or any ITS or automatic tutoring system, is modified to identify and respond adaptively to the learner's or student's affective states (i.e., emotional states) during a typical learning experience, in addition to adapting to the learner's cognitive states. To accomplish this, the system comprises new signal processing models and algorithms, as well as several non-intrusive sensing devices. In one embodiment, the system identifies and assesses affective states through dialog assessment techniques, video capture and analysis of the learner's face, determination of the body posture of the learner, a pressure sensitive mouse, and a pressure sensitive keyboard.

Figure 2:
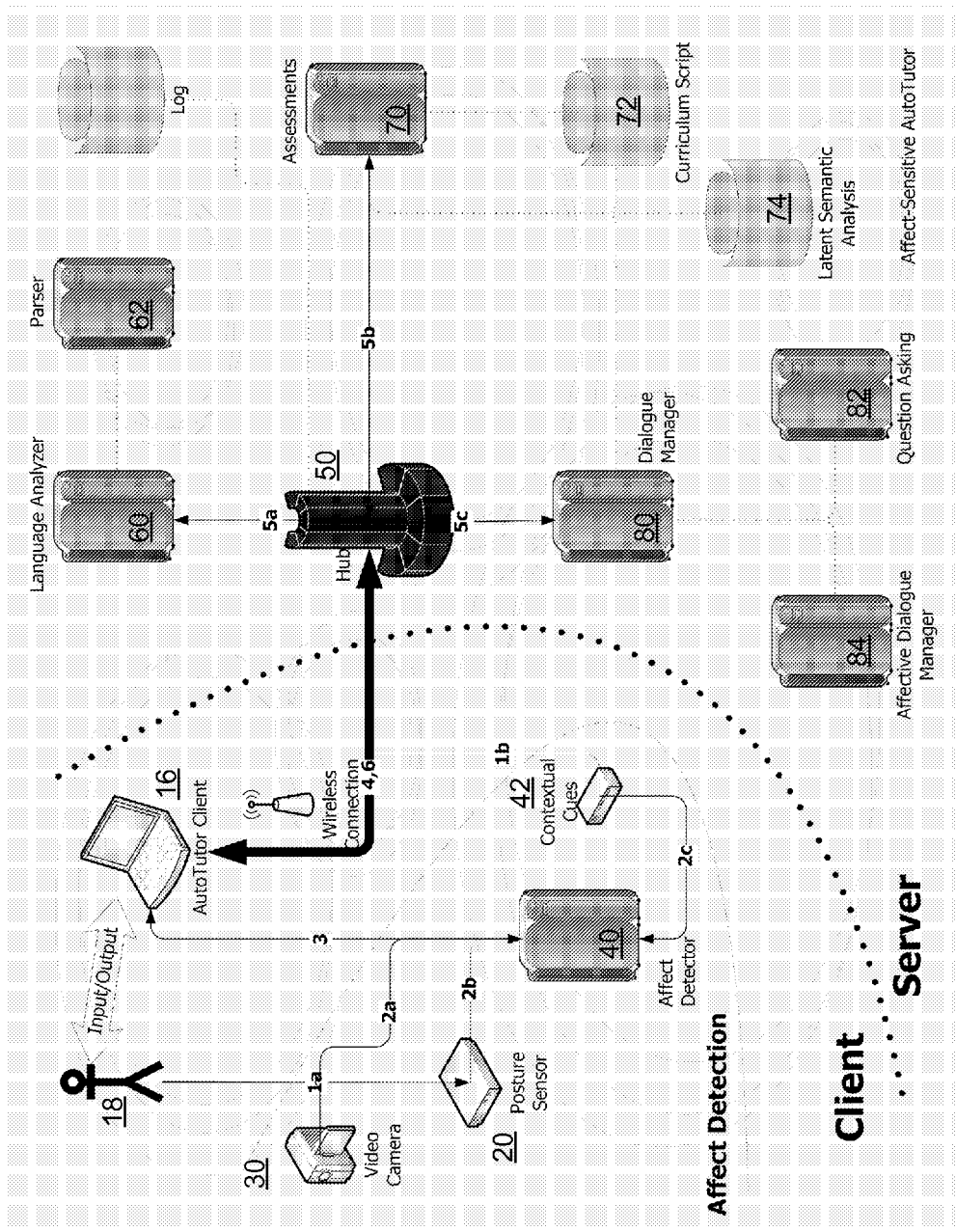
FIG. 2 is a diagram of an ITS system in accordance with an embodiment of the present invention.

FIG. 2 shows an exemplary embodiment of an affect-sensitive AutoTutor client 16 interacting with a user (i.e., student or learner) 18. As described in more detail below, the system in this configuration comprises a posture sensor 20, a video camera for facial feature recognition 30, and an affect detector component 40 which uses contextual cues 42 from the dialog. The client is in electronic communication with a server or server hub 50 which manages or contains the various components of the AutoTutor system. These components include a Language Analyzer 60 (with a parser 62) to analyze the user responses and answers. The Assessment 70 component uses the curriculum script 72 and LSA 74 components to assess the responses and answers, and interacts with the Dialogue Manager 80 to determine the appropriate feedback to the user. The Dialogue Manager comprises a language generation component, including short feedback, questions, and other dialogue contributions, 82 (to determine the dialogue moves in the next turn), and an Affective Dialogue Manager 84, to determine the type and nature of affective feedback.

Accordingly, the present invention synthesizes the input from the above measures, and responds with appropriate conversational and pedagogical dialog that scaffolds the learners through a sequence of emotions. For example, if a student is frustrated, then AutoTutor responds with an empathetic response coupled with a good hint or prompt that would guide the learner back toward their zone of knowledge. In another example, AutoTutor may prolong a state of confusion to promote the student's own problem solving skills during the state of cognitive disequilibrium, which could lead to deeper learning and misconception remediation. The system can scaffold learners to new levels of understanding through an ideal sequence of emotions: intellectual arousal, confusion combined with curiosity (cognitive disequilibrium), and moments of delight, while minimizing frustration, anger, and boredom. It thus provides a unique learning environment that is unavailable in previous tutorial interactions.

The various components and measures for determining the emotional state of the user, and generating appropriate feedback, are described below.

Pressure Sensitive Mouse and Keyboard

In one embodiment, the pressure sensitive mouse comprises a mouse equipped with a haptic pressure sensor. The system receives input on the amount of pressure being placed on the mouse at any given time. In another embodiment, the pressure sensitive keyboard comprises a keyboard with pressure sensors on the keys or other points on the keyboard. The system receives input on the amount of pressure being placed on the keyboard, or a part thereof, at any given time.

Body Posture.

There are benefits to using posture as a means to diagnose the affective states of a user. Human bodies are relatively large and have multiple degrees of freedom, thereby providing them with the capability of assuming a myriad of unique configurations. These static positions can be concurrently combined and temporarily aligned with a multitude of movements, all of which makes posture a potentially ideal affective communicative channel. Posture can offer information that is sometimes unavailable from the conventional non-verbal measures such as the face and paralinguistic features of speech. For example, the affective state of a person can be decoded over long distances with posture, whereas recognition at the same distance from facial features is difficult or unreliable. Perhaps the greatest advantage to posture, based affect detection is that body motions are ordinarily unconscious, unintentional, and thereby not susceptible to social editing, at least compared with facial expressions, speech intonation, and some gestures. While some affective states are best conveyed through the face, others are best manifested through other non-verbal channels such as posture, which is correlated with student interest. For example, students experiencing flow may tend to lean forward in the chair, whereas a bored student may slump back, or show persistent agitation (i.e., shifting of body weight).

One option for automated posture analysis is to use cameras and associated computer vision techniques to monitor body position and movement of a user. However, this approach may have problems that affect nearly all computer vision-based applications, such as lighting, background conditions, camera angles, and other factors.

In another embodiment, the determination of body posture is accomplished by means of a pressure measurement device (e.g., one or more thin-film pressure pads or mats), which can be mounted on a variety of surfaces. These pads or mats can measure relative pressure on different parts of the seat on which the student is sitting, for example. In one embodiment, the system uses the Tekscan Body Pressure Measurement System (BPMS) to monitor student's patterns while they interact with the system. The BPMS gauges the distribution of pressure on surfaces (e.g., seat, back). In one exemplary embodiment, the system uses two sensor pads to ascertain student's posture patterns as they interact with the tutor. The sensing area comprises 16,128 individual sensing elements (measuring pressure in mmHg). The first pad is placed on the seat. The second sensor pad is placed on the back support of the chair. The output from the sensor pads may be analyzed by dividing the sensing region into quadrants (or some other appropriate number of areas, such as nine) and assessing the net force in each quadrant. This is preferred over a fine-grained analysis of each individual sensing point, as the former may be more indicative of general body movement, and more computationally efficient.

In another embodiment, the system may automatically detect a learner's interest level using a neural network for real-time classification of nine static postures (e.g., leaning back, leaning right, right leg crossed, sitting upright, and the like). In this embodiment, the system recognizes interest (e.g., high interest, low interest, and taking a break) by analyzing posture sequences.

Facial Expressions.

In one embodiment comprising facial expression analysis, facial assessment is accomplished using an upper facial sensor system. In one embodiment, recognition of facial expressions is a multi stage process. First, the system locates and tracks the pupils of the eye in real-time. Second, the system fits templates to the upper facial features (eyes and brows) in real-time. Third, the system labels facial action units. In one embodiment, up to six upper facial action units are labeled. A facial recognition system of this sort provides a 12-dimensional vector corresponding to action units around the eyes.

In one embodiment comprising facial expression analysis, facial assessment is accomplished using a sensor system that tracks regions of the face. Particular facial expressions are correlated with particular emotions. For example, frustration is associated with outer brow raise, inner brow raise, and the dimpler, whereas confusion is associated with brow lowerer, lid tightener, and lip corner puller. Boredom is associated with eye closure, along with eye blinks and various mouth movements, such as mouth opening and closing and jaw drop (perhaps a yawn). These facial expressions can be tracked with several different facial tracking systems known in the art.

Dialog Pattern Analysis.

In another embodiment of the present invention, dialog patterns are analyzed to help determine affective states. The pattern analysis module keeps track of the dialog with the student, and detects patterns of dialog that are indicative of affective states based upon the dialog within that session, and upon the student's interactive history. The system's log files provide a wealth of information regarding the interactive session with the student. At each student turn, the tutor system writes its assessment of the student's response along with some internal information to a form of stable storage (e.g., hard disk). Assessment of the student's responses includes, but is not limited to, the following information: the correctness of an answer, the verbosity of the student response, the coherence of the dialogue, reaction and response times, and a host of other parameters about the conceptual quality of the student's turns.

In one embodiment, the system uses the Speech Act Classification System to classify the student's response into five broad dialog categories: meta-communicative; meta-cognitive; questions, short responses, and substantive contributions. After assessing a student's response, the tutor provides short feedback on the contribution (positive, negative, neutral), and makes a substantive dialog move (e.g., hint, prompt, assertion) that advances the conversation. The sequence of these dialog events by the tutor and student are mined to determine learner emotions.

In another embodiment, the system keeps track of seven different affect states that potentially occur during the process of learning: confusion; frustration; boredom; flow/engagement; delight; surprise; and neutral. Other embodiments may keep track of a subset of these states (e.g., confusion; flow/engagement; boredom; and frustration), or additional states.

For example, one element tracked is how far the student has progressed through the particular session or through a particular subtopic. This information may include the number of questions that have been answered in the session (Subtopic Number), and the number of student turns that attempt to answer a single question (Turn Number). Tiredness or boredom may be associated with a high Subtopic Number, and frustration may be associated with a high Turn Number (i.e., the student is stuck in the current subtopic).

Another measure is Learner Verbosity, the number of words or alphanumeric characters in the student's response. Short responses may reflect frustration or confusion. Longer responses may reflect a deeper grasp of concepts, perhaps due to the learner being in a state of flow (i.e., heightened engagement).

Another measure relies upon the evaluation of the student's contributions in each turn to good and bad answers. Student response assessment is conducted using LSA and other semantic matching algorithms. The local assessments for a given turn measure the student's response for that turn on the basis of its similarly to good vs. bad answers (i.e., expectations vs. misconceptions). The Local Good Score is the highest match to the set of expectations representing good answers. The Local Bad Score is the highest match to the set of bad answers. A high Local Good Score indicates progress, while a high Local Bad Score may be interpreted as a student's misconception. The Delta Local Good Score and the Delta Local Bad Score measure the changes in the Local Good Score and Local Bad Score, respectively, between certain turns. In one embodiment, they measure the changes between the current turn (N) for a subtopic and the immediately preceding turn (N−1). Thus, for example, a large Delta Local Good Score might indicate a eureka experience and mental state.

Similarly, these four parameters can be determined for all responses in a given subtopic, 1 through N (i.e., the text used for the LSA match is an aggregation of all of the student's responses in the given subtopic). These parameters are Global Good Score, Global Bad Score, Delta Global Good Score, and Delta Global Bad Score. These permit a student's past responses to a subtopic to be considered in the system's assessment of the student's current response.

In one exemplary embodiment, LSA-based assessments are not applied to all contributions of the learner within each turn. The system first segments the learner's verbal input within each turn into sentential units and classifies the units into categories. Some categories of learner contributions do not provide information that is relevant to an answer, such as short responses ("yes"; "okay"), meta-communicative statements ("What did you say?"), meta-comprehension statements ("I don't understand"; "that makes sense"), and learner questions. Other categories of learner contributions are assertions that help answer the automated tutor's main questions. It is the learner assertions that are analyzed with respect to the quality of learner contributions.

After the learner enters information within each turn, the system generates the content of the next turn in a fashion that adapts to what the learner expressed in the previous turns and to the dialogue history. The content of most of the turns consists of short feedback (positive, negative, neutral) on the learner's contributions in turn N−1, one or more dialogue moves that help answer the question, and a final dialogue move that attempts to get the learner to contribute to the dialogue (such as asking the student a question). The system then generates the feedback and dialogue moves in a fashion that is pedagogically appropriate.

The dialogue moves generated by the automated tutor vary on a scale of "directness." At the low end of the continuum, the system provides "pumps" or hints to get the learner to do the talking and express answer information. At the high end of the continuum, the system delivers information through assertions and summaries. In one embodiment, the automated tutor starts out giving indirect pumps and hints to get an expectation covered, but resorts to direct assertions when the learner has trouble articulating the expectation. It starts out each main question (subtopic) by pumping the learner for information (e.g., "what else?", "uh huh"). After this pumping phase, the system identifies expectations that are not covered by the student and attempts to get these covered one expectation at a time. Whenever expectation "E" needs to be covered, the system launches a [hint->prompt->assertion] cycle in three successive turns. After the hint is given, the student sometimes articulates the answer correctly so the tutor system exits the cycle and goes onto another expectation. If the student's response is inadequate, however, then the system presents a prompt on the next turn to get the student to fill in a missing important word. If the student covers the expectation with an answer, the system goes on to the next expectation. If not, then the system generates an assertion in the next turn and thereby covers the expectation.

This hint-prompt-assertion mechanism adapts to the learner's knowledge. The system ends up presenting mainly pumps and hints to students who are performing well, whereas low performing students require more prompts and assertions. The final phase of each main question is a summary answer, which is provided by the tutor.

The dialog moves chosen by the system can be regarded as an indicator of the amount of information delivered to the student. In one embodiment, five dialog moves can be mapped onto a scale in the following order: pump; hint; prompt; assertion; and summary. A pump conveys the minimum amount of information (on the part of the system), whereas a summary conveys the most amount of explicit information (i.e., the tutor system is more direct and supplies more information).

In one embodiment, automated tutor directness may be correlated with the affect states of learners. For example, confusion may heighten after the occurrence of hints (i.e., when the student is expected to think, often to no avail) and to diminish in the presence of assertions and summaries (i.e., when the student can simply receive information from AutoTutor rather passively).

Emotion Classification and Feedback.

In an exemplary embodiment, the system comprises several methods of assessing and classifying affective emotional states based upon the various input streams or channels. The system comprises an Emotion Classifier that takes due consideration of cognitive and discourse metrics or categories that accumulate during the tutorial dialog. This classifier comprises a set of input features $\{F\}$ and a set of categories $\{C_1, C_2, \ldots C_n,\}$. A particular category $C_i$ can be predicted based upon the input features $g(\{F\})$. The input features may be obtained from the input streams or sensory channels described above. In one embodiment, the classifier is a combination of standard and biologically motivated classifiers.

The system may comprise two different approaches to classification. First, the system integrates the data from all input streams or sensory channels into a high dimensional vector before attempting classification. Second, the system individually classifies each input stream or sensory channel, and then integrates the classifications of each stream or channel into a super classifier, in order to output a single emotion. Since the output of the input streams or sensory channels is inherently different in nature, a single classifier may be unable to provide an optimal classification. Therefore, in one exemplary embodiment, all classification tasks are replicated by a series of classifiers ranging from more traditional methods (standard classifiers) to more sophisticated biologically motivated, neural network based classification systems.

Standard classifiers include a number of well-known mechanisms, each with a set of limitations. They can be divided into broad categories such as Decision Tree Induction, Bayesian Classification, Neural Network approaches, Fuzzy Classifiers, Genetic Algorithm Based Classifiers, and the like. Each category itself consists of several classification algorithms.

In one embodiment, affect-detection is achieved via a multimodal approach where each sensor independently provides its own diagnosis of the user's or student's affective state. These individual diagnoses are combined with a decision-level fusion algorithm that selects a single affective state and a confidence value of the detection. The algorithm relies on a voting rule enhanced with a few simple heuristics. One exemplary embodiment involves affect diagnosis with a camera, a posture sensor, and the AutoTutor dialogue.

Figure 3:
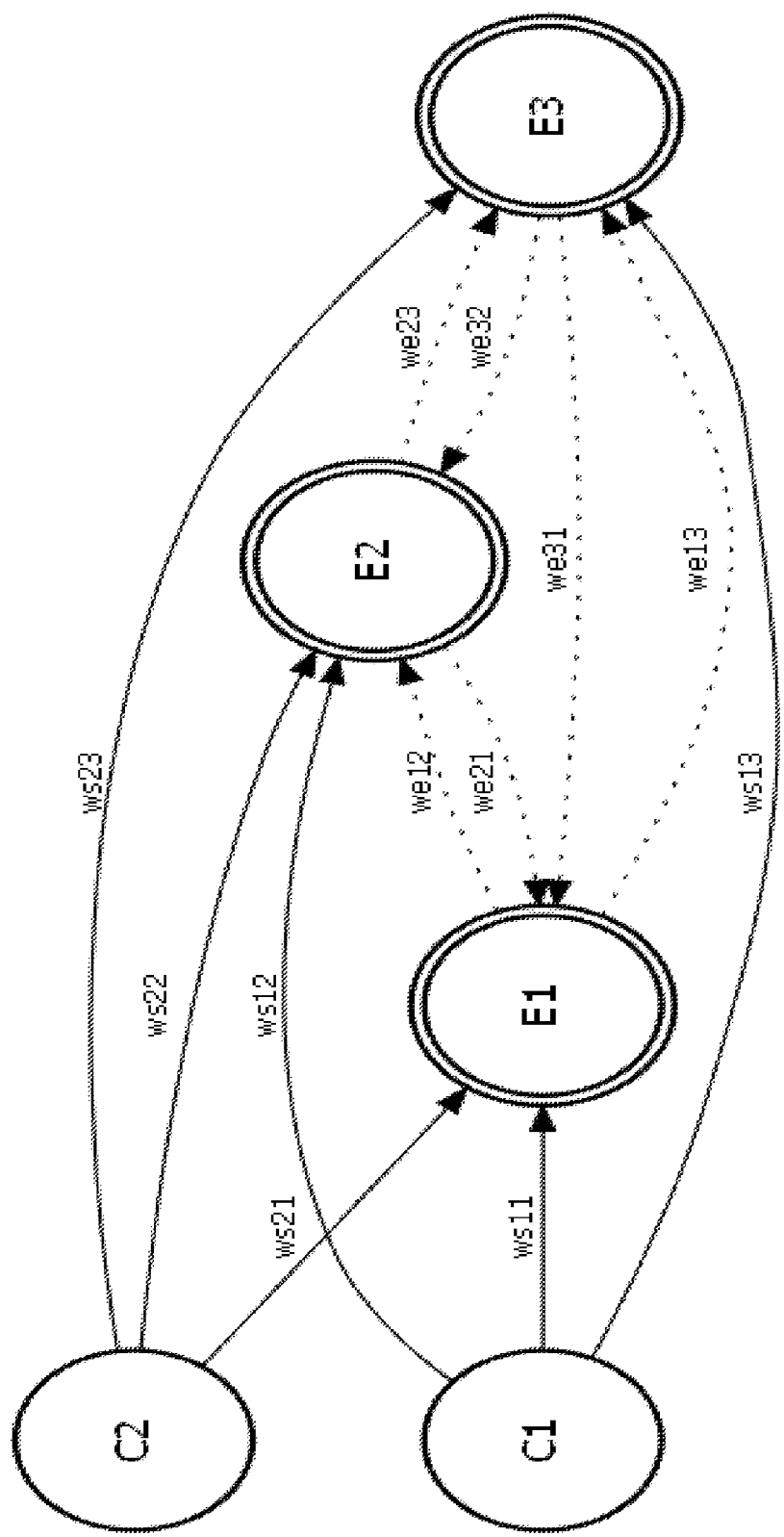
FIG. 3 is a diagram of a sample spreading activation network in accordance with an embodiment of the present invention.

A spreading activation network with projecting and lateral links is used to model decision-level fusion. A sample network is presented in FIG. 3. This hypothetical network has two sensor nodes, S1 and S2, and three emotion nodes, E1, E2, and E3. Each sensor is connected to each emotion by a projecting link (solid lines). The degree to which a particular sensor activates a particular emotion is based on the accuracy by which the sensor has detected the emotion in the past (see ws weights in FIG. 3). So if the BPMS is more accurate at detecting boredom than confusion, it will excite the boredom node more than the confusion node, even if its current estimates on the probability of both emotions are approximately equivalent.

Each emotion is also connected to every other emotion with a lateral link (dotted lines). These links are weighted and can be excitatory or inhibitory (see we weights in FIG. 3). Related emotions excite each other while unrelated emotions inhibit each other. For example, confusion would excite frustration but boredom would inhibit engagement.

Each emotion node receives activation from both link types and maintains an activation value. At any time, the emotion node with the highest activation value is considered to be the emotion that the learner is currently experiencing.

In this exemplary embodiment, the decision-level fusion algorithm operates in four phases.

i. Detection by Sensors. Each sensor provides an independent estimate of the likelihood that the learner is experiencing an emotion. The likelihood can be represented as a probability value for each emotion.
  ii. Activation from Sensors. Sensors spread activation and emotion nodes aggregate this activation.
  iii. Activation from Emotions. Each emotion spreads the activation received from the sensors to the other emotions, so that some emotions are excited while others are inhibited.
  iv. Decision. The emotion with the highest activation is selected to be the emotion that the learner is currently experiencing.

Assume that a set of m sensors are monitoring a set of n emotions. Such a network would contain m+n nodes, (i.e., a node for each sensor and a node for each emotion), and (m×n)+n(n−1) links. Here, (m×n) represents the number of projecting links between each sensor and each emotion, whereas n(n−1) is the number of lateral links between the emotions (an emotion is connected to every other emotion excluding itself).

Each emotion node has an activation value $e_j$ that represents the degree to which this emotion is activated at time t. Each emotion node receives activation from its lateral as well as its projecting links. Let: $a_{ij}^s$ be the activation from sensor node i on emotion j, and $a_{jk}^e$ be the activation on j from another emotion node k (j≠k). Summing up the two sources of activation, the total activation of emotion j is:

$$e_j = \sum_{i=1}^{m} a_{ij}^s + \sum_{\substack{k=1 \\ k \neq j}}^{n} a_{kj}^e \qquad \text{Eq. 1}$$

The links between each sensor node and emotion are weighted. Let $w_{ij}^s$ be the weight between sensor node i and emotion node j. If $s_{ij}$ is the probability by which sensor i detects emotion j, then $a_{in}^s$ can be specified as:

$$a_{ij}^s = w_{ij}^s \times s_{ij} \qquad \text{Eq. 2}$$

The links between the various emotion nodes are also weighted. Let $w_{ki}^e$ be the weight between emotion node j and emotion node k(j≠k). Now if $e_k$ is the activation of emotion k, then the lateral activation that emotion k spreads to emotion j, or $a_{jk}^e$ is:

$$a_{jk}^e = w_{kj}^e \times e_k \qquad \text{Eq. 3}$$

Substituting Eq. 2 and Eq. 3 in Eq. 1 yields:

$$e_j = \sum_{i=1}^{m} w_{ij}^s \times s_{ij} + \sum_{\substack{k=1 \\ k \neq j}}^{n} w_{kj}^e \times e_k \qquad \text{Eq. 4}$$

The decision-level framework described above assumes that the sensors have equal sampling rates, in the sense that they activate emotion nodes at approximately equal intervals. Complications occur because this assumption is routinely violated in practical applications. For example, the BPMS sensor requires about 3-4 seconds of data to detect an emotion. On the other hand, data from the dialogue is only available every 20-40 seconds. In this situation, the activation values of the BPMS will inhibit the activation values of the dialogue sensor because the BPMS is being updated more frequently.

This problem can be corrected by introducing a parameter $r_i$, which is the sampling rate of sensor i, Dividing the activation received from each sensor by its sampling rate adjusts for any biases caused by heterogeneous sampling rates. The corrected values for $a_{ij}^s$ and $e_i$ are specified in Eq. 5 and Eq. 6, respectively.

$$a_{ij}^s = \frac{w_{ij}^s \times s_{ij}}{r_i} \qquad \text{Eq. 5}$$

-continued $$e_j = \sum_{i=1}^{m} \frac{w_{ij}^s \times s_{ij}}{r_i} + \sum_{\substack{k=1 \\ k \neq j}}^{n} w_{kj}^e \times e_k \qquad \text{Eq. 6}$$

Regulating Negative Emotions

In another exemplary embodiment, the system comprises a set of production rules or strategies to determine how best to respond to the various emotional states, including, in particular, the negative emotional states (e.g., boredom, confusion, frustration). These production rules incorporate psychological perspectives (e.g., attribution theory, cognitive disequilibrium during learning, empathy) with approaches derived from experience.

In one embodiment, the production rules interact with a student model and a tutor model. There are five parameters in the student model and five parameters in the tutor model. The parameters in the student model include the following: (a) the classification of the current affective state detected; (b) the confidence level of that affect classification; (c) the previous affective state detected; (d) a global measure of student ability (dynamically updated throughout the session); and (e) the conceptual quality of the student's immediate response. The tutor system incorporates this five-dimensional assessment of the student and responds with the following: (a) feedback for the current answer; (b) an affective statement; (c) the next dialogue move; (d) an emotional display on the face of the tutor agent; and (e) an emotional modulation of the voice produced by the tutor's text-to-speech engine.

As an example, consider a student that has been performing well overall (high global ability), but the most recent contribution was not very good (low current contribution quality). If the current state was classified as boredom, with a high probability, and the previous state was classified as frustration, then the tutor might respond as follows: "Maybe this topic is getting old. I'll help you finish so we can try something new." The response would be a randomly selected phrase from a list that was designed to indirectly address the student's boredom and to try to shift the topic a bit before the student became disengaged from the learning experience. The rules thus are context sensitive and dynamically adaptive to each individual learner.

FIG. 1 shows an example of an emotional display on the face of the tutor agent. In this example, the tutor agent is displaying a skeptical face, because the tutor detected that the student was hedging. Other facial expressions include, but are not limited to, approval, disapproval, enthusiasm, surprise, empathy, and neutral.

Computing Environment.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An automated affect-sensitive tutoring system, comprising:
    at least one pressure measurement device on a chair or seat;
    a computing device, said computing device comprising a microprocessor, means for receiving input from a user, and a non-transitory computer-readable storage medium with an executable program stored thereon, wherein the program engages in an interactive tutoring session with the user;
    a dialog pattern analysis module, wherein the dialog pattern analysis module detects patterns of dialog within the tutoring session that indicate affective states of the user by analyzing
        the correctness of the user's answer,
        the verbosity of the user's answer,
        the length of the user's answer,
        the number of attempts by the user to answer a single question, and
        the number of questions that have been answered in the interactive tutoring session; and
    at least one camera for determining the posture and facial expressions of the user during the interactive tutoring session.

2. The system of claim 1, wherein the means for receiving input comprises a keyboard, a computer mouse, a microphone, or a combination thereof.

3. The system of claim 1, wherein the at least one pressure measurement device comprises at least one pressure-sensitive pad placed on the sitting surface of the seat or chair, and at least one pressure-sensitive pad placed on the back of the seat or chair.

4. The system of claim 1, further comprising a facial expression analysis program that receives images of the facial expression of the user from the at least one camera.

5. The system of claim 1, wherein the system determines the affective state of the user.

6. The system of claim 1, wherein the system performs an assessment of the user's affective state based upon the classification of the current affective state detected, the confidence level of that affective classification, the previous affective state detected, a measure of the user's ability, and the conceptual quality of the user's immediate prior response.

7. The system of claim 5, wherein the system determines its next interaction with the user based upon the system's determination of the user's affective state.

8. The system of claim 7, wherein the next interaction with the user comprises feedback for the user's immediate prior response, an affective statement, the next dialogue move, an emotional display on the face of a system tutor agent on a computer monitor connected to the computer device, and emotional modulation of the voice produced by a text-to-speech engine on the computing device.

9. The system of claim 7, wherein the next interaction with the user comprises displaying gestures by an animated tutor agent on a computer monitor connected to the computer device.

10. The system of claim 1, further comprising a text-to-speech engine.

11. The system of claim 7, further wherein the next interaction with the user comprises mixed-initiative dialogue.

12. The system of claim 2, wherein the means for receiving input comprises a keyboard, wherein the keyboard is further configured to measure the amount of pressure placed on the keyboard by the user.

13. The system of claim 2, wherein the means for receiving input comprises a mouse, wherein the mouse is further configured to measure the amount of pressure placed on the mouse by the user.

14. The system of claim 7, wherein the system determines its next interaction with the user based upon the application of a set of dynamic, context-sensitive production rules to the following parameters:
   the classification of the current affective state detected;
   the confidence level of that affect classification;
   the previous affective state detected;
   a dynamically updated global measure of user ability; and
   the conceptual quality of the user's immediate response.

* * * * *